[12] United States Patent
Wille

(10) Patent No.: US 6,893,196 B2
(45) Date of Patent: May 17, 2005

(54) BLIND RIVET NUT AND FASTENING UNIT

(75) Inventor: Lothar Wille, Mörfelden-Walldorf (DE)

(73) Assignee: GESIPA Blindniettechnik GmbH, Frankfurt (DE)

( * ) Notice: Subject to any disclaimer, the term of this patent is extended or adjusted under 35 U.S.C. 154(b) by 0 days.

(21) Appl. No.: 10/160,430

(22) Filed: May 31, 2002

(65) Prior Publication Data

US 2002/0192047 A1 Dec. 19, 2002

(30) Foreign Application Priority Data

May 31, 2001 (DE) .......................................... 101 26 747

(51) Int. Cl.⁷ .............................................. F16B 13/04
(52) U.S. Cl. .............................. 411/34; 411/55; 411/45; 411/183; 411/969
(58) Field of Search ................................ 411/969, 352, 411/353, 34–38, 45–48, 55, 183

(56) References Cited

U.S. PATENT DOCUMENTS

| 2,763,314 | A | * | 9/1956 | Gill | 411/34 |
| 3,136,203 | A | * | 6/1964 | Davis | 411/38 |
| 3,209,806 | A | * | 10/1965 | Currier et al. | 411/361 |
| 3,319,918 | A | * | 5/1967 | Rapata | 248/239 |
| 3,443,473 | A | * | 5/1969 | Tritt | 411/38 |
| 3,498,352 | A | * | 3/1970 | Duffy | 411/302 |
| 3,505,921 | A | * | 4/1970 | Wigam | 411/34 |
| 3,698,278 | A | * | 10/1972 | Trembley | 411/34 |
| 3,789,728 | A | * | 2/1974 | Shackelford | 411/34 |
| 4,426,181 | A | * | 1/1984 | Omata | 411/33 |
| 4,674,930 | A | * | 6/1987 | Poe et al. | 411/40 |
| 4,784,550 | A | * | 11/1988 | Wollar | 411/32 |
| 4,854,438 | A | * | 8/1989 | Weissenberger et al. | 192/107 R |
| 4,984,946 | A | * | 1/1991 | Phillips, II | 411/34 |
| 5,246,323 | A | * | 9/1993 | Vernet et al. | 411/29 |
| 5,259,714 | A | | 11/1993 | Campbell | |
| 5,540,528 | A | * | 7/1996 | Schmidt et al. | 411/55 |
| 5,919,016 | A | * | 7/1999 | Smith et al. | 411/34 |

FOREIGN PATENT DOCUMENTS

| DE | 9104365 | 9/1992 |
| DE | 9114473 | 2/1993 |
| EP | 0494747 | 9/1996 |
| EP | 0936362 | 8/1999 |
| GB | 633479 | 12/1949 |
| GB | 2300031 | 10/1996 |
| GB | 2310904 | 9/1997 |

* cited by examiner

Primary Examiner—William L. Miller
(74) Attorney, Agent, or Firm—Friedrich Kueffner

(57) ABSTRACT

A blind rivet nut has a shank with a thread and a deformation zone. The blind rivet nut has also a set head with a larger outside diameter than that of the shank. The set head has a deformable extension on a side opposite the shank. A fastening unit formed with the blind rivet nut has a bolt having a threaded shank and a bolt head with an outside diameter larger than an outside diameter of the threaded shank and at least as large as an outside diameter of the deformable extension.

22 Claims, 3 Drawing Sheets

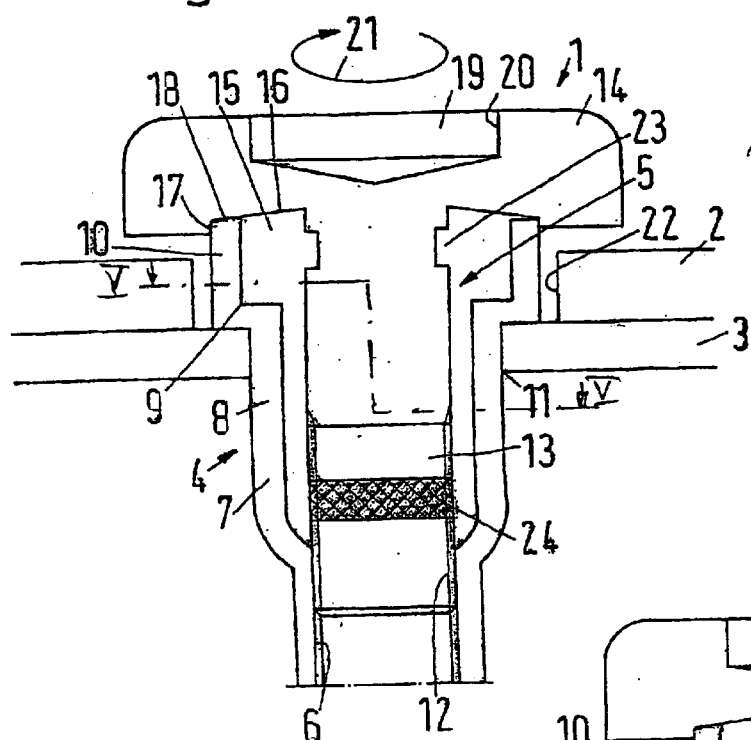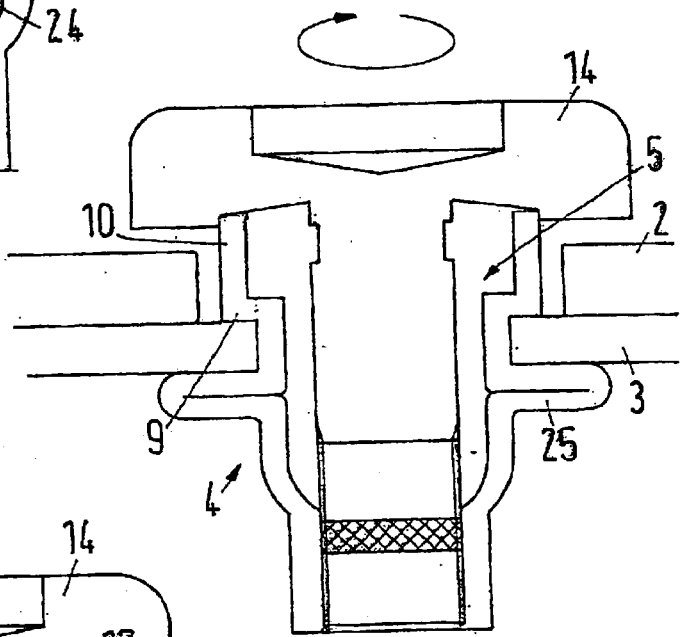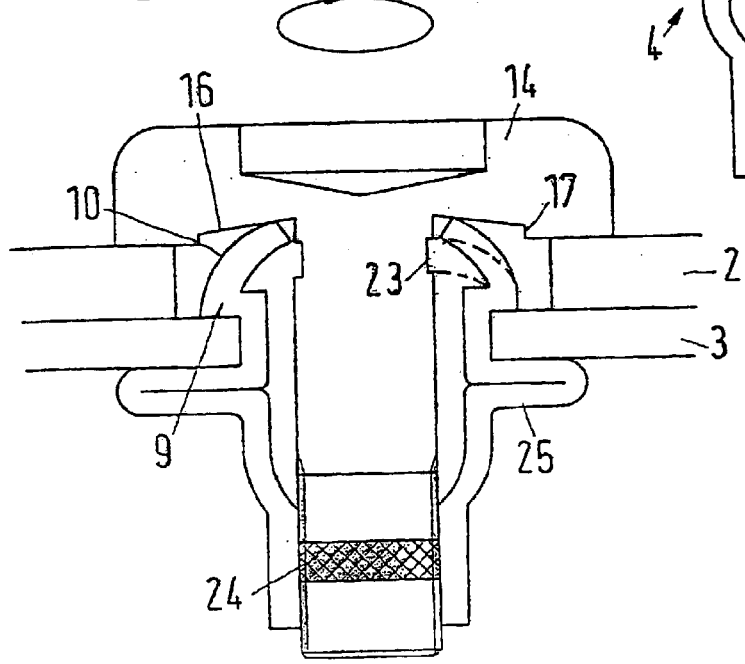

BLIND RIVET NUT AND FASTENING UNIT

BACKGROUND OF THE INVENTION

1. Field of the Invention

The invention concerns a blind rivet nut with a shank comprising a thread and a deformation zone, with a set head having a larger outside diameter than the shank. Further, the invention concerns a fastening unit with a blind rivet nut of this kind.

2. Description of the Related Art

Blind rivet nuts have been tried and tested for fastening tasks in which a screw connection is required in thin-walled materials, for example, sheet metals, in which normally no thread can be cut. The blind rivet nut is in this case fixed in the sheet metal like a blind rivet and, after fastening thereof, provides a thread for a screw connection which thread has sufficient axial length. The blind rivet nut is set normally by screwing a threaded mandrel into the thread of the shank and placing the blind rivet nut in the preformed hole of the sheet metal. By pulling on the threaded mandrel, the deformation zone is deformed and expanded, with the result that a closing head is produced on the side of the sheet metal opposite the set head. The closing head anchors, together with the set head, the blind rivet nut in the sheet metal. Subsequently, the threaded mandrel is unscrewed. The blind rivet nut is then available as a receptacle for a fastening bolt.

A blind rivet nut of the kind mentioned hereinbefore is known from U.S. Pat. No. 5,259,714 A, which shows the fastening unit together with the bolt. The set head of the nut is made very large and provided with recesses, whereby the nut is to be prevented from also turning when the bolt is tightened. With the blind rivet nut it is possible to fasten one component to another component. A drawback with this solution is that the torque for tightening the bolts is transmitted to the component to be fastened. Hence, the component to be fastened may possibly turn as well, leading to consequential damage. Moreover, the part to be fastened is no longer releasable.

EP 0 494 747 B1 shows a blind rivet nut with preassembled bolt. The bolt head is at a predefined distance from the set head of the blind rivet nut. Hence, the bolt can be used to set the nut. To fasten a workpiece to a component, however, the bolt must first be unscrewed and then screwed back in together with the workpiece.

GB 2 310 904 A shows a blind rivet nut in which the shank comprises two deformation zones with different deformation properties. Thus, it is possible to connect two sheet metals to each other successively in stages. Then a further workpiece can be fastened to the combined sheet metals by means of a bolt. However, three operations are required to fasten the actual workpiece.

EP 0 936 362 A2 shows a blind rivet nut with a shank which is stepped on the outside and has a greater wall thickness adjoining the set head. As this region has an axial length which is greater than the thickness of the sheet metal, it is possible to fasten the nut in the sheet metal loosely or rotatably. The workpiece is screwed on after the operation of setting the blind rivet nut.

GB 2 300 031 A shows a combination of blind rivet nut, expanding portion, and bolt. With this combination, a workpiece can be movably and releasably fastened to a sheet metal in several steps. However, the combination consists of three parts. A pulling operation followed by a screwing operation is required for fastening.

With the known blind rivet nuts, several operations are therefore always required in order to fasten a component to a sheet metal or to a comparable plate-like material, namely screwing a pull mandrel into the blind rivet nut, forming the closing head on the reverse side of the sheet metal, unscrewing the pull mandrel and screwing the fastening bolt in. Alternatively, the blind rivet nut can also be used to connect two components to each other permanently after the fashion of a rivet. But in this case the connection is not releasable.

SUMMARY OF THE INVENTION

It is the object of the invention to simplify the releasable fastening of components to sheet metals or comparable plate-like workpieces.

In accordance with the present invention, this is achieved with a blind rivet nut of the kind mentioned hereinbefore by the fact that the set head comprises a deformable extension on its side opposite the shank.

When "sheet metals" are mentioned below, this also means other comparable plate-like workpieces on which a thread fastening is to be performed.

The new blind rivet nut is ultimately fastened exactly like a conventional blind rivet nut. The shank is passed through an opening formed in the sheet metal and deformed by pulling on the thread in such a way that the deformation zone forms a closing head. Thus, the blind rivet nut is held reliably in the sheet metal. The advantage lies however in that the fastening operation and the setting operation can now be performed in a single work cycle. The blind rivet nut is passed with a fastening bolt through the workpiece to be fastened. The shank of the blind rivet nut is then passed through the opening in the sheet metal. Naturally, the fastening bolt can also be introduced after the blind rivet nut has already been inserted in the sheet metal. When the fastening bolt is now tightened, on account of the tension which the fastening bolt exerts on the shank via the thread, the deformation zone is thus deformed and forms the closing head in a conventional way. On account of the extension, in this case it is ensured that the set head of the blind rivet nut is pressed against the sheet metal with the necessary force, so that a rivet connection with sufficient strength can be obtained. Due to the fact that the extension is also deformable, it is ensured that the workpiece can be held fast on the sheet metal with the necessary force when the bolt is turned further. Therefore, not only is a reliable fastening of the blind rivet nut in the sheet metal achieved, but also an equally reliable fastening of the workpiece to the sheet metal. This combined operation is performed practically exclusively by turning the fastening bolt in a single operation. This turning can perfectly well be performed with a motor-driven tool, for example a screwing tool which is operated electrically or with compressed air. By monitoring the screwing torques in individual sections, it can also be monitored whether the operation of setting the blind rivet nut, that is, formation of the set head, and fastening of the workpiece are carried out with sufficient force and reliability. The fastening operation is over when both the closing head is formed and the fastening bolt is applied to the workpiece. The deformable extension automatically adapts to the thickness of the component to be fastened. Upon tightening the fastening bolt, fastening of the component to the sheet metal is therefore completed in a single operation. Nevertheless, it is possible to undo the connection again by unscrewing the fastening bolt. In this case, however, the blind rivet nut is not taken out of the sheet metal. Instead, it remains riveted in.

Preferably, the extension is of a tubular configuration. It thus surrounds the fastening bolt at least approximately uniformly so that upon deformation an approximately uniform resistance is produced in the circumferential direction.

Preferably, the extension has a greater deformation resistance than the deformation section of the shank. Hence, the sequence of deformations can be controlled. First the deformation section of the shank is deformed to form the closing head of the blind rivet nut. The extension in this case serves as an abutment with which the fastening bolt presses the set head with sufficient force against the sheet metal. When the setting operation is over, and the closing head is formed in this way, a further deformation of the shank is basically not possible. The force applied by turning the fastening bolt further is then used to deform the extension. This embodiment has the advantage that the fastening bolt does not turn, or possibly turns only at the end of the operation of fastening onto the component. Damage to the component is therefore prevented.

Preferably the extension has a larger outside diameter than the shank. This is a relatively simple measure for increasing the deformation resistance of the extension. At the same time the area for engagement of the bolt head of the fastening bolt is increased.

In this connection, it is particularly preferred that the extension has the same outside diameter as the set head. Thus basically the maximum possible diameter of the extension is realized. The blind rivet nut acquires an attractive appearance. No obtrusive projections are formed on the circumferential surface of the blind rivet nut.

In an alternative, or additional, embodiment it may be provided that the extension has a greater wall thickness than the shank in the deformation zone. With this measure, it is also possible to increase the deformation resistance of the extension in comparison to that of the shank.

Preferably, the extension and/or the shank has a polygonal configuration in cross-section. In many cases, to prevent turning of the blind rivet nut in the sheet metal, it is necessary to form the outside cross-section of the blind rivet nut, at least in the region which is held fast in the sheet metal, with a polygonal shape, for example as a hexagon. If this polygonal shape is continued farther beyond the set head, then manufacture is simplified, on the one hand. On the other hand, there is the option of letting a tool, for example a hexagon spanner, engage there when it is desired to screw the fastening bolt in or unscrew it when the blind rivet nut is not set.

Preferably, the extension comprises a shaped portion which influences a direction of deformation. In this way, it is possible to determine whether the extension is to be deformed radially inwardly or outwardly. Depending on which type of fastening is desired, the shaped portion in one or the other direction can be advantageous.

In this connection, it is particularly preferred that the extension is chamfered at its end face. This chamfer can then under certain circumstances serve as an engagement surface for the bolt head, to cause deformation in a predetermined direction.

Preferably, the deformation zone and/or the extension is slotted. By slotting, which is preferably effected in the axial direction, the deformation resistance of the deformation zone and/or extension can be influenced.

Preferably, a reinforcement is arranged at the junction between the extension and the set head. In this way, reshaping of the extension is favored, i.e., it is prevented that the set head is accidentally reshaped also by reshaping the extension. Particularly in the case of thin material thicknesses, the reinforcement is advantageous.

In this connection, it is preferred that the reinforcement is formed by an inclined chamfer which at least partially fills an angle between the extension and the set head. Making a chamfer of this kind is relatively easy.

According to the invention, the object is achieved for a fastening unit with a blind rivet nut of the kind described above and with a bolt having a threaded shank and a bolt head with an outside diameter larger than the threaded shank, which outside diameter is at least as large as the outside diameter of the extension.

As described above in connection with the blind rivet nut, fastening of a component to a sheet metal can be achieved in a single operation with a fastening unit of this kind. When the bolt is screwed into the blind rivet nut, then the deformation zone produces the closing head on the reverse side of the sheet metal, while the set head is pressed against the front side of the sheet metal with the necessary force throughout the entire screw-in operation by means of the extension.

Preferably, the bolt head has a larger outside diameter than the set head of the nut. It is then possible to pass the set head completely through a hole in the component and yet ensure that the bolt head with the projecting regions acts on the component. But, in principle, it is also sufficient when the bolt head has the same diameter as the set head. In this case, however, the extension must have a smaller outside diameter. The blind rivet nut must be introduced after unscrewing the bolt from the opposite side of the component. When, on the other hand, the diameter of the bolt head is larger, then the blind rivet nut can be passed from one side through the component and through the sheet metal.

Preferably, the bolt head abuts the extension. When the bolt and the blind rivet nut are accordingly preassembled, both parts can be screwed together with a certain, although low tension, so that the bolt is held reliably in the blind rivet nut and the risk of the bolt being lost remains small.

Preferably, a bolt-fixing adhesive is applied to the thread of the bolt outside the thread of the nut. In the unassembled state of the blind rivet nut, the bolt can be screwed into the thread of the blind rivet nut only by a predetermined distance. A region of the thread of the bolt which is not yet engaged with the thread of the nut inevitably remains. To this section can be applied a bolt-fixing adhesive which is, for example, packed in microcapsules which burst open when this region is screwed into the thread of the blind rivet nut. Automatic locking of the bolt in the blind rivet nut is then obtained upon screwing in the bolt.

Preferably, the bolt head comprises a recess on its lower side facing the nut. This recess can have two functions. On the other hand, it can receive a portion of the extension, even if this extension has been reshaped. Thus, it is ensured that the extension always abuts the bolt head of the bolt, even if the bolt has been screwed on until it contacts the component. On the other hand, with this recess a certain control possibility can be realized for influencing deformation of the extension.

Preferably, the recess, at least in some sections, is defined by a projection extending in the direction of the nut, and the extension is arranged radially within the projection. With this configuration it is ensured that even upon deformation the extension always remains at least with its front end within a certain region, namely, always within the recess bounded by the projection. The region of the bolt head located radially on the outside is then available for abutment on the component.

In this connection, it is particularly preferred that the recess comprises a beveled bottom. The extension can then slide along this beveled bottom when the extension is deformed.

Preferably, the bolt comprises below the bolt head a groove in the threaded shank. This groove serves as a locking groove in which the upper end of the extension can engage when the extension has been reshaped accordingly.

Also it is preferred that a component surrounds the set head of the blind rivet nut, wherein the thickness of the workpiece at least in the region of the fastening unit is smaller than the length of the set head. The set head also encompasses the extension. With this configuration it is ensured that the bolt acts first on the extension and thus on the set head when the blind rivet nut is fastened in the sheet metal.

Upon rotation of the bolt, the component is not acted upon initially. Such action occurs only when the extension has been deformed accordingly.

Preferably, the bolt head is split in a radial direction, wherein an outer portion abuts the extension and an inner portion is rotatable relative to the outer portion and acts in an axial direction on the outer portion. This embodiment is advantageous particularly when the fastening unit is used in conjunction with relatively thin sheet metals. With this arrangement, a higher torque is prevented from being applied via the extension to the blind rivet nut. The inner portion is connected in torque-transmitting relationship to the threaded shank. When therefore the inner portion is turned, then the threaded shank is turned relatively to the blind rivet nut without a corresponding torque being transmitted to the extension.

In this connection, it is particularly preferred that the outer portion comprises a hold-fast assembly and the inner portion comprises a torque-engagement surface. With the hold-fast assembly the outer portion can be prevented from rotating, so that it does not turn when the inner portion is turned. The inner portion, on the other hand, can be turned via the torque-engagement surface, for example, a hexagon socket.

BRIEF DESCRIPTION OF THE DRAWING

The invention is described below with the aid of a preferred embodiment in connection with the drawings. They show:

FIG. 1 a fastening unit before fastening of a component;

FIG. 2 the fastening unit during fastening of the component;

FIG. 3 the fastening unit after fastening of the component;

FIG. 5 is a sectional view taken along sectional line V—V of FIG. 1, showing polygonal cross-sections of the deformable extension and the shank.

DESCRIPTION OF THE PREFERRED EMBODIMENTS

Figure 4:
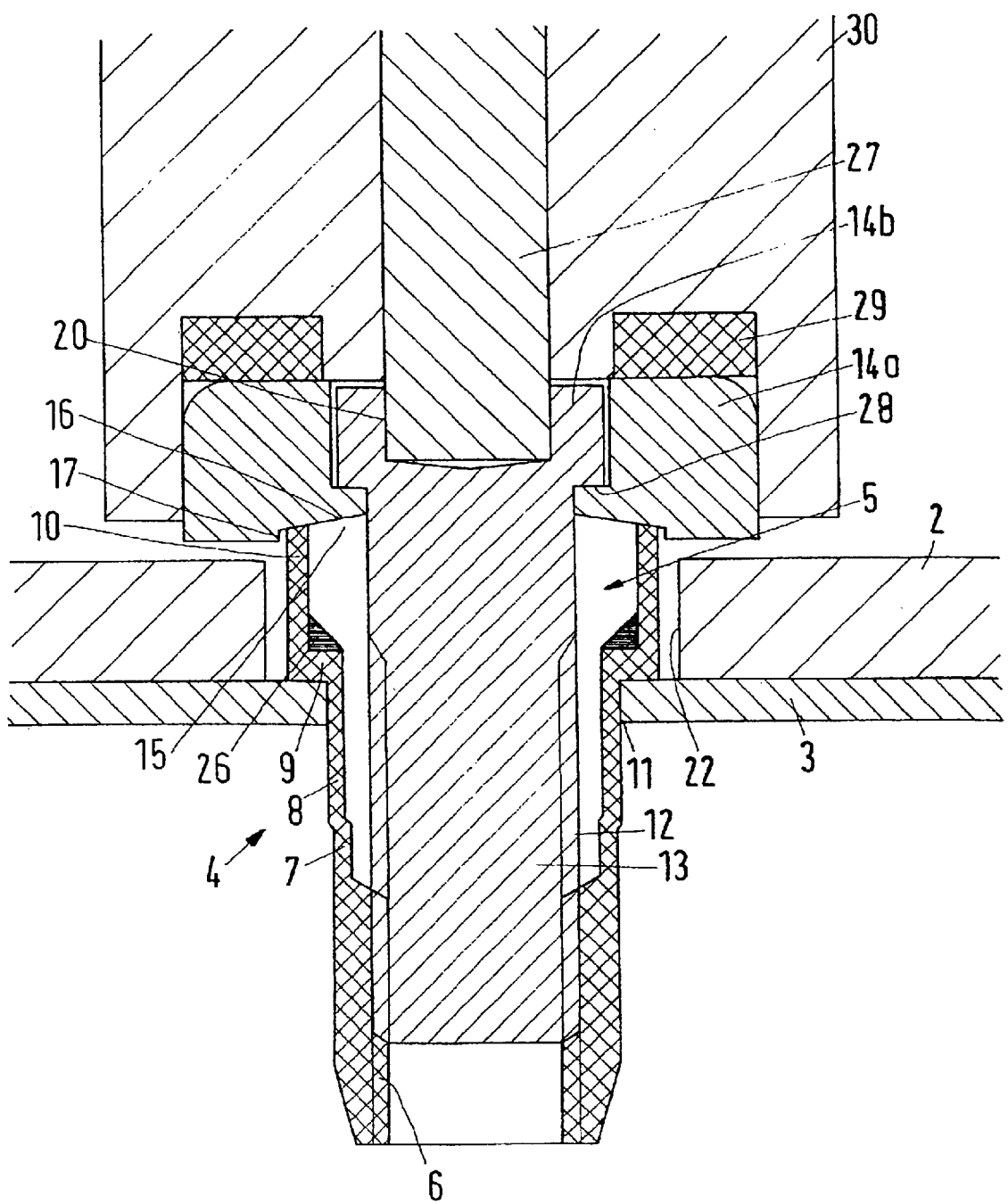
FIG. 4 a second embodiment of a fastening unit before fastening of a component.
Figure 6:
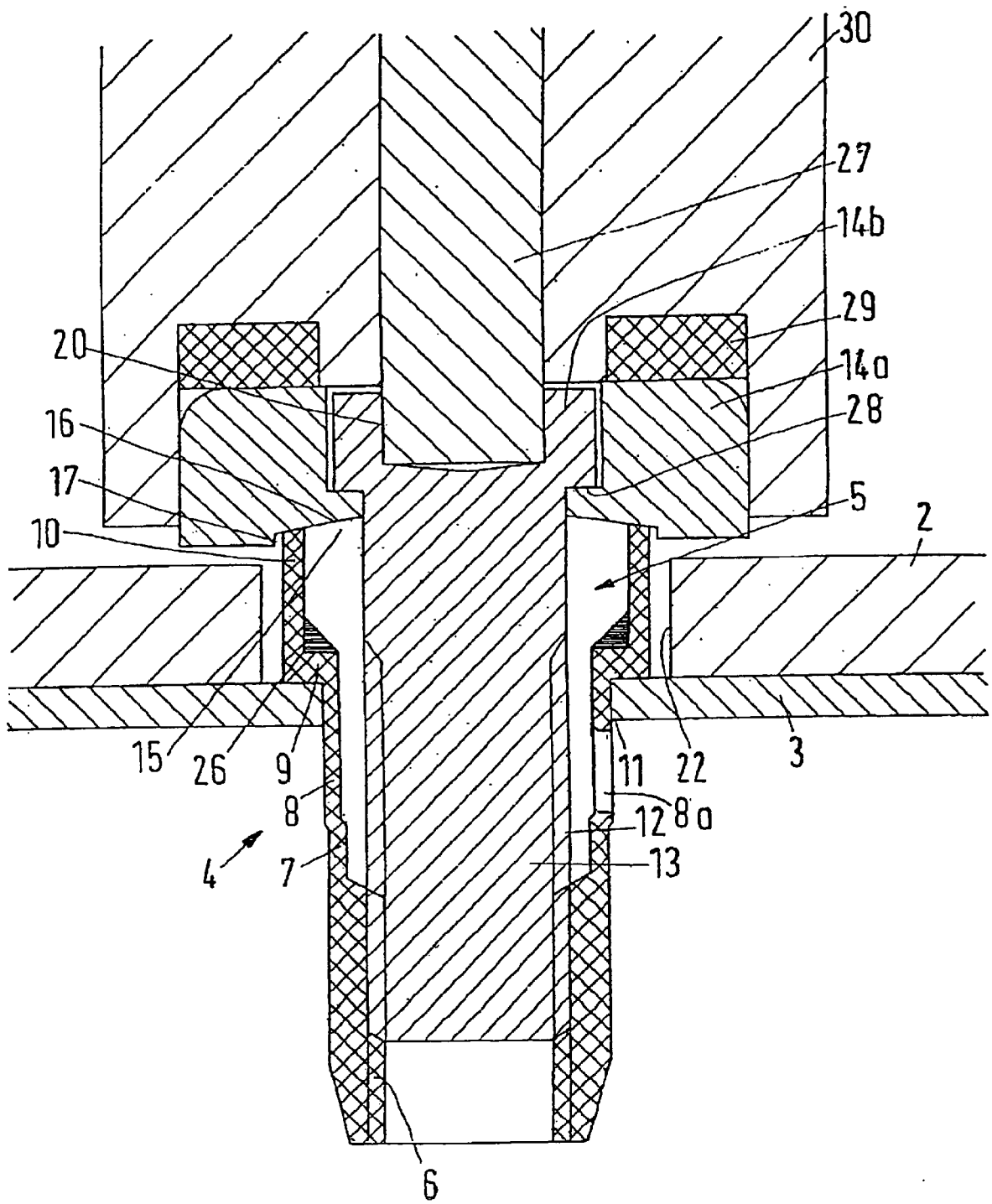
FIG. 6 is a view as in FIG. 4 with a slotted deformation zone.

A fastening unit 1 for fastening a component 2 (also referred to as a "workpiece") to a sheet metal 3 comprises a blind rivet nut 4 and a bolt 5. "Sheet metal" in this context means not only sheets made of metal, but also correspondingly thin members made of other materials such as plastic, wood or the like, in which a thread is required for making a releasable connection, which sheets, however, are too thin or too weak to allow a thread being produced therein.

The blind rivet nut 4 comprises an internal thread 6 which is arranged at the lower end of a shank 7. The shank 7 comprises a deformation zone 8 above the internal thread 6. Above the deformation zone 8 the blind rivet nut 4 comprises a set head 9. The set head 9 comprises an extension 10 which extends upwards, that is, is located opposite the side of the set head 9 on which the shank 7 is arranged.

The direction information "top" and "bottom" refers to the view of the drawings and serves to simplify the description. If the blind rivet nut 4 has a different orientation in space, the directional information must be altered accordingly.

The shank 7 is provided with a polygonal outer contour in a region below the set head 9, for example, it has a hexagonal shape. This hexagonal shape fits in a through-opening 11 of corresponding hexagonal design in the sheet metal 3, so that the blind rivet nut 4 is held non-rotatably in the sheet metal 3 when it is inserted in the through-opening 11.

The bolt 5 comprises an external thread 12 with which it is screwed into the internal thread 6 of the blind rivet nut 4. In this connection, the external thread 12 is arranged on a threaded shank 13 which ends in a bolt head 14 at the top. The bolt head 14 has an outside diameter which is substantially larger than the outside diameter of the extension 10. The bolt 5 is screwed so far into the blind rivet nut 4 that the extension 10 with its end face abuts against the bolt head 14 under a low tension. For this purpose, the bolt head 14 has a recess 15 which comprises a beveled bottom 16. The recess 15 is surrounded by a projection 17. This projection can extend all the way round. But in some cases it is enough when the projection 17 is interrupted in the circumferential direction.

The end face of the extension 10 can, as shown in the left half of FIG. 1, comprise the same beveling as the bottom 16 of the recess 15. But it can also be made plane, as shown in the right half of FIG. 1. In the former case the end face of the extension 10 comprises a chamfer 18.

On the upper side of the bolt head 14, a recess 19 with a torque-engagement surface 20 is arranged, for example, a hexagon socket, in which a tool can be inserted to turn the bolt in the direction of the arrow 21 or in the opposite direction. Upon clockwise rotation, the bolt 5 travels farther into the blind rivet nut 4 when a right-handed thread is involved.

The set head 9 of the blind rivet nut 4 has a diameter which is so large that the set head 9 sits on the sheet metal 3 when the blind rivet nut 4 is inserted in the through-opening 11 of the sheet metal 3. The component 2 which is to be fastened to the sheet metal 3 comprises an opening 22 which is larger than the outside diameter of the extension 10, but smaller than the diameter of the bolt head 14.

The extension 10 has a deformation resistance which is greater than the deformation resistance of the deformation zone 8.

The threaded shank 13 comprises, slightly below the bolt head 14, a peripheral groove 23. The external thread 12 is provided with a bolt-fixing adhesive 24 in a region which lies outside the internal thread 6 when the bolt is in the screwed-in position in the blind rivet nut 4 shown in FIG. 1.

To fasten the component 2 to the sheet metal 3, the fastening unit is preassembled, i.e., the bolt 5 is screwed so far into the blind rivet nut 4 that the projection 10 abuts the bolt head 14 within the recess 15. In this state, the bolt-fixing adhesive 14 is still located outside the internal thread 6. The deformation zone 8 is not yet deformed, and the blind rivet nut 4 still fits without problems through the through opening 11 in the sheet metal 3.

The fastening unit 1 is now passed through the bore 22 of the component 2 and then inserted into the through-opening 11 on the sheet metal 3. As can be seen from the drawings, in this case the set head 9 of the blind rivet nut 4 on account of the extension 10 has a height which is greater than the thickness of the component 2. When the bolt 5 is now turned, for example, by means of a motor-driven screwing tool whose torque can be monitored, then the external thread 12 is screwed into the internal thread 6. As the projection 10 abuts against the bolt head 14, but the extension 10 has a higher deformation resistance than the deformation zone 8, first the deformation zone 8 will be deformed to form a closing head 25, as shown in FIG. 2. As simultaneously the set head 9 can be pressed against the sheet metal 3 with the required force, the rivet connection which is formed by the set head 9 and the closing head 25 is produced with the desired reliability and strength. The component 2 is not yet loaded when the rotational movement of the bolt head 14 occurs. There is still a certain distance between the bolt head 14 and the component 2. As can be seen in FIGS. 1 and 2, this distance can perfectly well assume a certain quantity, so that the same fastening unit 1 can be used with components 2 of different thickness.

When the closing head 25 has been fully formed, as illustrated in FIG. 2, the torque required to turn the bolt 5 increases. This can be recorded, for example, by the torque-monitored screwing tool.

Further rotation of the bolt 5 then leads to the extension 10 being deformed. This deformation is shown in FIG. 3. The sloping bottom 16 of the recess 15 ensures that deformation of the extension 10 always takes place only radially inwardly. Outward yielding is prevented by the projection 17.

Depending on the configuration of the deformable extension 10, under certain circumstances it can even be guaranteed that the extension 10 enters the groove 22, as shown in dashed lines in the right half of FIG. 3.

Due to deformation of the extension 10, bolt head 14 sooner or later comes into contact with the component 2 and can then clamp the latter tightly against the sheet metal 3, so that the component 2 is reliably fastened to the sheet metal 3.

Due to the bolt-fixing adhesive 24 which becomes effective later and, optionally, due to the locking groove 23 in which the extension 10 engages, an excellent locking action of the bolt 5 against accidental release is provided.

The connection can be released intentionally by turning the bolt 5 in the opposite direction. When the bolt 5 has been unscrewed from the blind rivet nut 4, the component 2 can be removed from the sheet metal 3.

The extension 10 can be designed simply as a tubular portion. But it can also have a modified shape, for example, a hexagon shape. The deformation zone 8 and/or the extension 10 can comprise axially extending slots 8a which can control the deformation behavior. Owing to the larger diameter of the extension 10, for identical wall thickness, the extension 10 will have a greater deformation resistance than the deformation zone 8. However, it can be provided additionally that the extension 10 has a greater wall thickness.

It is, of course, advantageous, but not absolutely necessary, that the outside diameter of the extension 10 corresponds to the outside diameter of the set head 9. It is important that the blind rivet nut 4 can always be held in contact with the sheet metal 3 by the bolt head 14 and the extension 10.

FIG. 4 shows a modified embodiment of a fastening unit in which identical parts have been given the same reference numbers.

First, a reinforcement 26 is provided between the set head 9 and the extension 10 and is formed by a sloping chamfer which fills an angle between set head 9 and the extension 10. In the present case the angle is completely filled. But in many cases it is enough to partially fill the angle. The reinforcement 26 causes the deformation of the extension 10 to be confined to the extension 10 and prevents it from impacting the set head 9.

Furthermore, the bolt head is now configured differently. It is split into a radially outer portion 14a and a radially inner portion 14b. The radially inner portion 14b carries the torque-engagement surface 20 in which a suitable tool 27 can be inserted to turn the threaded shank 13. The inner portion 14b in this case abuts a shoulder 28 of the outer portion 14a in an axial direction, so that axial compression forces, which arise when the threaded shank 13 is screwed into the shank 7 of the blind rivet nut 4, are transmitted to the outer portion 14a of the bolt head. The outer portion 14a, on the other hand, does not turn when it is screwed in. A tool 30 which holds the outer portion 14a fast can be provided with suitable hold-fast means. For instance, the outer portion 14a can be provided with two notches in which a portion of the tool 30 engages. But it is also possible to provide the outer portion 14a with a hexagon insert bit and the tool 30 with a hexagon socket adapted thereto. Finally, a magnet support 29 is also provided, with which the fastening unit can be held in the tool 30.

The fastening procedure is as follows. The fastening unit is inserted into the tool 30 and held there by means of the magnet assembly 29. In the tool 30, the portion 27 is rotatable in order to drive the threaded shank 13 via the inner portion 14b of the bolt head. The outer portion 14a, on the other hand, is held non-rotatably in the tool 30. When the blind rivet nut 4 with the inserted bolt 5 is now inserted in the workpiece 3 and the threaded shank 13 is rotated, the outer portion 14a of the bolt head is held fast, so that no torque is transmitted to the threaded nut, and, in particular, no torque is transmitted to the extension. A torque with the associated friction arises only between the outer portion 14a and the inner portion 14b of the bolt head. But this is not critical because the outer portion 14a is prevented from turning.

Hence, absolutely no torque is transmitted to the component 3 during screwing on. The outer portion 14a of the bolt head which is held fast is simply lowered without rotational movement onto the component and clamps it fast. This is important particularly when the component 3 is relatively soft or thin-walled. With this embodiment, a torque-assisting bulge of the hole 11 in the workpiece 3 is no longer required under certain circumstances.

While specific embodiments of the invention have been shown and described in detail to illustrate the inventive principles, it will be understood that the invention may be embodied otherwise without departing from such principles.

What is claimed is:

1. A blind rivet nut comprising:
   a shank comprising a first end, a second end, a thread at the first end and a deformation zone between the thread and the second end;

a set head having an outside diameter larger than an outside diameter of the second end of the shank, the set head being attached to the second end of the shank;

wherein the set head comprises a deformable extension on a side of the set head opposite the shank, wherein the deformable extension of the set head has a greater deformation resistance than the deformation zone of the shank.

2. The blind rivet nut according to claim 1, wherein the deformable extension is tubular.

3. The blind rivet nut according to claim 1, wherein the deformable extension has a larger outside diameter than the shank.

4. The blind rivet nut according to claim 3, wherein the deformable extension and the set head have the same outside diameter.

5. The blind rivet nut according to claim 1, wherein the deformable extension of the set head has a greater wall thickness than the deformation zone of the shank.

6. The blind rivet nut according to claim 1, wherein at least one of the deformable extension and the shank has a polygonal cross-section.

7. The blind rivet nut according to claim 1, wherein the deformable extension comprises a shaped portion configured to influence a direction of deformation.

8. The blind rivet nut according to claim 7, wherein the deformable extension has a free end face and the free end face is chamfered.

9. The blind rivet nut according to claim 1, wherein at least one of the deformation zone of the shank and the deformable extension is slotted.

10. The blind rivet nut according to claim 1, comprising a reinforcement arranged at a junction between the deformable extension and the set head.

11. The blind rivet nut according to claim 10, wherein the reinforcement is formed by an inclined chamfer which at least partially fills an angle area between the deformable extension and the set head.

12. A fastening unit comprising:

a blind rivet nut having a shank, comprising a first end, a second end, a thread at the first end and a deformation zone between the thread and the second end, and a set head having an outside diameter larger than an outside diameter of the second end of the shank, the set head being attached to the second end of the shank, wherein the set head comprises a deformable extension on a side of the set head opposite the shank; and a bolt having a threaded shank and a bolt head with an outside diameter larger than an outside diameter of the threaded shank and at least as large as an outside diameter of the deformable extension, wherein the deformable extension of the set head has a greater deformation resistance than the deformation zone of the shank.

13. The fastening unit according to claim 12, wherein the outside diameter of the bolt head is larger than the outside diameter of the set head.

14. The fastening unit according to claim 12, wherein the bolt head abuts the deformable extension.

15. The fastening unit according to claim 14, wherein a bolt-fixing adhesive is applied to the thread of the bolt outside the thread of the blind rivet nut.

16. The fastening unit according to claim 12, wherein the bolt head comprises a recess on a lower side facing the blind rivet nut.

17. The fastening unit according to claim 16, wherein at least some sections of the recess are defined by a projection extending in the direction of the blind rivet nut, and the deformable extension is arranged radially within the projection.

18. The fastening unit according to claim 16, wherein the recess comprises a beveled bottom.

19. The fastening unit according to claim 12, wherein the threaded shank of the bolt comprises a groove below the bolt head.

20. The fastening unit according to claim 12, wherein a component surrounds the set head of the blind rivet nut, wherein the thickness of the component at least in the region of the fastening unit is smaller than a length of the set head.

21. The fastening unit according to claim 12, wherein the bolt head is split in a radial direction into an outer portion and an inner portion, wherein the outer portion abuts the deformable extension and the inner portion is rotatable relative to the outer portion and acts in an axial direction on the outer portion.

22. The fastening unit according to claim 21, wherein the outer portion comprises a hold-fast assembly and the inner portion comprises a torque-engagement surface.

* * * * *